S. A. MERKLEY.
PROCESS OF INCUBATION.
APPLICATION FILED FEB. 11, 1913.
1,091,859.
Patented Mar. 31, 1914.
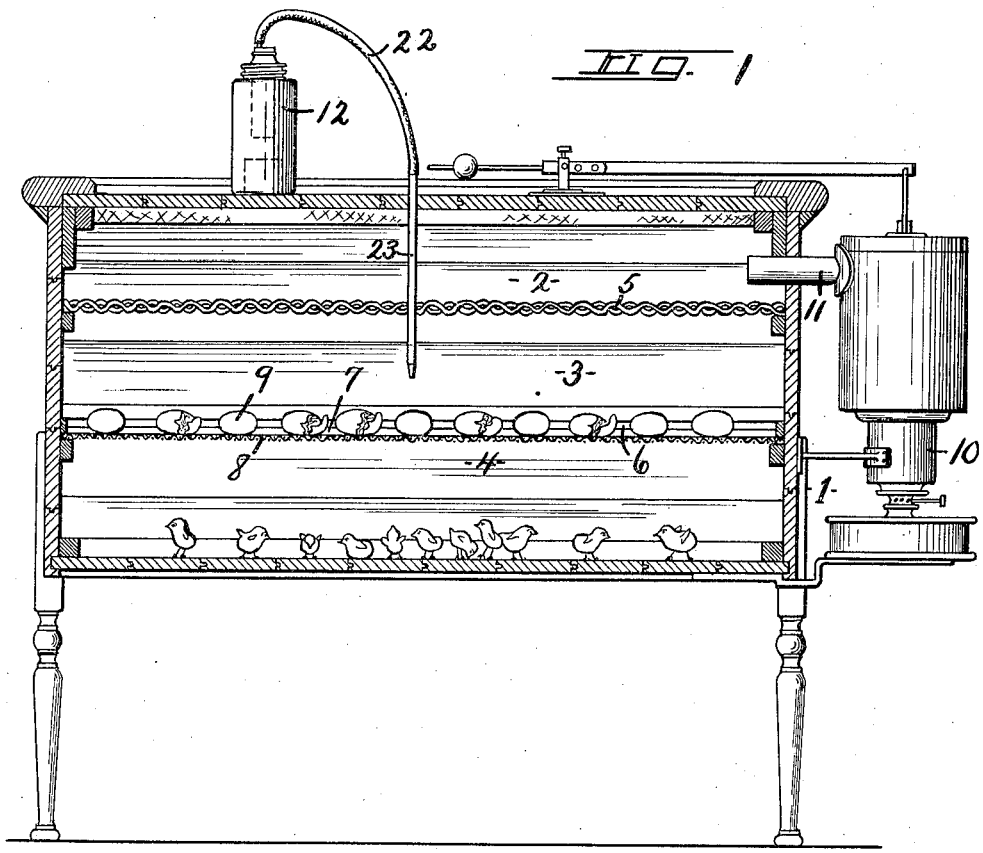
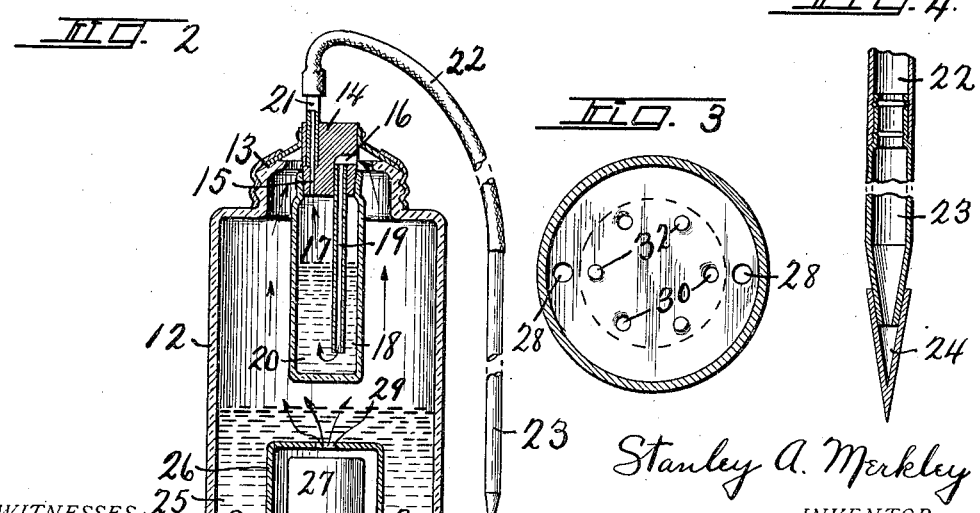
Stanley A. Merkley
INVENTOR.
BY Howard P. Denison
ATTORNEY.
WITNESSES:
H. W. Hurst
E. A. Thompson

UNITED STATES PATENT OFFICE.

STANLEY A. MERKLEY, OF BUFFALO, NEW YORK, ASSIGNOR TO MERKLEY MANUFACTURING COMPANY, OF BUFFALO, NEW YORK, A CORPORATION OF NEW YORK.

PROCESS OF INCUBATION.

1,091,859.   Specification of Letters Patent.   Patented Mar. 31, 1914.

Original application filed August 3, 1911, Serial No. 642,126. Divided and this application filed February 11, 1913. Serial No. 747,667.

*To all whom it may concern:*

Be it known that I, STANLEY A. MERKLEY, of Buffalo, in the county of Erie, in the State of New York, have invented new and useful Improvements in Processes of Incubation, of which the following, taken in connection with the accompanying drawings, is a full, clear, and exact description.

This invention relates to a process of incubation and more particularly to a process for the incubation of fowls, such as chickens, ducks, turkeys and the like, and is a division of my pending application Serial No. 642,126, filed August 3rd, 1911, and the claims in this application are for the process set forth and described in my said pending application.

It is well known among those versed in the art of incubation that substantially thirty per cent. (30%) of good eggs fail to hatch and that a large percentage of the fowls which manage to get out of the shell later die by reason of the fact that their general vitality is so reduced by carbon dioxid and other poisons generated during the process of incubation that it is impossible to raise them. The generation of these poisons, particularly carbon dioxid, increases as the incubating period goes on and their effect upon the embryo, by experimentation has been discovered and demonstrated to increase in a greater ratio and particularly is this true between the fourteenth day of the incubating period and until the time at which the embryo has wholly absorbed the egg yolk. It is equally true that sufficient normally constituted air cannot be admitted to the chamber to counteract the effects of these poisons, for a sufficient circulation of air to carry off or neutralize these poisons to any advantageous degree, no matter how moist the air might be, will dry out the egg and render the embryo unhatchable. It is absolutely impossible for normally constituted air to, in any beneficial degree, counteract these poisons, if diffused in the chamber. A substantial circulation would be necessary, and it is well known that the opening of the incubating chamber for only a moment at the later stages of incubation, no matter how moist the entering air may be, will dry out the egg and render the embryo unhatchable, and it is, therefore, apparent that any substantial circulation will have a like effect. It is extremely important, therefore, that some process be devised whereby incubation may be carried on without subjecting the eggs, particularly during the later stages of the incubation, to the injurious and fatal effects of carbon dioxid and other poisons.

The primary object, therefore, of my invention is a process of incubation which is designed to get and results in getting a live, vigorous fowl from every good egg and I have discovered that this is accomplished by liberating within or in any manner supplying to, the incubating chamber substantially pure oxygen adapted to be diffused therethrough and which results in a neutralization of the carbon dioxid and other poisons given off during the incubating period, whereby not only life is generated and fostered within the egg, but the hatching fowl is so vitalized that the egg yolk is completely absorbed and a strong animal results.

A further object of the process is to hasten the decomposition of the lime salts in the shell of the egg and render it brittle and also prevent the drying out of the egg by moistening the oxygen liberated in the chamber.

Still another object is to prevent any substantial interference with the regulated temperature of the incubator by supplying this oxygen in a warmed condition in which condition it will also carry with it more moisture than if cold.

In the accompanying drawings, I have illustrated a means for carrying out my process.

Figure 1 is a longitudinal section of an incubator having an oxygen generator in connection therewith. Fig. 2 is a central vertical section of my improved oxygen generator. Fig. 3 is an enlarged horizontal section taken on line z—z, Fig. 2, the substance within the can or cartridge being omitted. Fig. 4 is an enlarged broken longitudinal section taken through a portion of the feed tube, it having a penetrating device applied to its end.

Referring now to the drawings in detail, like numerals of reference refer to like parts in the several figures.

The reference numeral 1 designates the incubator considered as a whole it being divided into three compartments 2, 3, 4, by two horizontal partitions 5, 6. The upper partition 5 separates the compartments 2 and 3 which may be termed, respectively, the heating compartment and the egg compartment, and may be either metal or fabric so as to radiate heat to the egg compartment beneath or diffuse the heat thereinto. The lowest chamber 4 is the fowl compartment which is separated from the egg compartment by the partition 6, but as the latter is made of open-work material, the compartments 3 and 4 may be considered as a single chamber having a support for the eggs. The partition or support 6 may be constructed of narrow pieces of wood 7 laid upon wire netting 8 to form troughs into which to lay the eggs 9, and at any desirable point, as is common in incubators, an opening or openings are provided in the partition 6 so that when the fowls are liberated from the shell, they can enter the compartment 4 as shown.

At one end of the incubator is a heater 10 of any approved construction having connection with the heating compartment 2, by means of a pipe 11 through which the necessary heat for incubation is delivered.

Thus far the description relates to one of several common forms of incubators which can be equipped with my invention.

My improved oxygen generator or vitalizer is designated by the numeral 33 and in the embodiment of my invention illustrated is located outside of the incubator. It comprises a casing 12 having an opening at its upper end which is closed in an air-tight manner by means of a closure 13 having a centrally depending plug 14 provided with a vertical passage 15 and an L-shaped passage 16 opening at the bottom and side of the plug.

Arranged centrally in the casing 12 is a purifier or bath —17 of which the plug of the closure 13 forms part. This purifier comprises a casing 18 having an opening at its upper end into which the plug 14 fits and depending from the plug is a tube 19 which has its upper end entered into the vertical branch of the L-shaped passage 16 in said plug and its lower end extending into a body of water 20 within the casing 18. Fitting into the vertical passage 15 in said plug is a tube 21 to which is secured one end of hose 22 having its other end connected to a metallic tube 23 which is passed through one of the walls of the incubator and terminates within the egg-compartment.

For the purpose of forcing the tube 23 through the wall of the casing and the partition 5, a penetrating device 24 is placed on the free end of the tube and after having driven the tube through the wall and partition, the penetrating device is removed so as to leave the end of the tube open for the escape of oxygen fed therethrough, as will presently appear.

A quantity of water 25 is placed in the outer casing 12 and submerged therein is a can or cartridge 26 containing a substance 27 in cake form or otherwise, which upon coming in contact with the water, will generate oxygen. For this purpose, the can or cartridge has water inlets 28 in its bottom and an oxygen escape opening 29 in its top, and in order that the water may enter freely, the bottom is provided with outwardly projecting teats 30 which hold the bottom of the can out of contact with the casing 12 so that the water has free access through the space 31 intervening.

The substance with the can or cartridge is preferably made in cake form and somewhat smaller than the can or cartridge so that the water comes in contact with as much of its surfaces as possible. To this end the bottom of the can or cartridge has a plurality of upwardly projecting teats 32 by which the cake is held elevated so that practically the entire surface of the cake is subjected to the action of the water.

The chemical action of the water and the substance within the can results in the generation of oxygen, which escapes through the opening 29, passes up through the water in the casing 12 so as to carry with it a percentage of moisture, and then rises to the upper end of the casing where it enters the L-shaped passage 16, and by the tube 19 is carried down into the body of water 20 in the casing 18 to be thereby purified, and in escaping from the water, the oxygen carries with it additional moisture and escapes through the passage 15, through the tube 21, the hose 22 and the metallic tube 23, to be liberated within the egg-compartment, and to the fowl-compartment beneath through the open-work partition 6.

The generation of the oxygen creates a certain degree of heat so that the oxygen is liberated from the feed tube, which the tubes 21, 23 and hose 22 constitute, in a warm condition so as not to change the temperature of the air within the incubator which it vitalizes.

It is apparent from the foregoing description that oxygen may be otherwise generated than by the device herein shown and described, as I have merely illustrated what I now deem the best method for the purpose intended. Therefore, many changes in application, construction or arrangements of parts may be resorted to without departing from my invention or sacrificing any of the advantages thereof.

What I claim is:

1. The process of incubation comprising the heating of the egg and increasing the oxygen contents of the air within the incubating chamber during the interval between the fourteenth day of the incubating period and the time at which the egg yolk is wholly absorbed by supplying to said chamber substantially pure oxygen.

2. The process of incubation comprising the heating of the egg and increasing the oxygen contents of the air within the incubating chamber during the interval between the time when the eggs begin to pip and the time when the embryo is hatched by supplying to said chamber substantially pure oxygen.

3. The process of incubation comprising the heating of the air within the incubating chamber, allowing fresh air to enter said chamber for substantially the first seventeen days of the incubating period, shutting off the entry of air to said chamber shortly before the eggs pip—that is, approximately at the eighteenth day, and diffusing in said chamber during the period in which it is closed, substantially pure oxygen.

4. The process of incubation comprising the heating of the air within the incubating chamber and increasing the oxygen content of said air from substantially the time the eggs begin to pip until the embryo is hatched, by supplying to said chamber substantially pure oxygen.

5. The process of incubation comprising the heating of the air within the incubating chamber and increasing the oxygen content of said air from substantially the eighteenth day of the incubating period until the embryo is hatched, by supplying to said chamber substantially pure oxygen.

In witness whereof I have hereunto set my hand this 3rd day of February, 1913.

STANLEY A. MERKLEY.

Witnesses:
EUGENE A. THOMPSON,
EVA E. GREENLEAF.

Copies of this patent may be obtained for five cents each, by addressing the "Commissioner of Patents, Washington, D. C."